(12) United States Patent
Chang et al.

(10) Patent No.: US 10,996,480 B1
(45) Date of Patent: May 4, 2021

(54) HEAD-UP DISPLAY CALIBRATION

(71) Applicant: GM GLOBAL TECHNOLOGY OPERATIONS LLC, Detroit, MI (US)

(72) Inventors: Kai-Han Chang, Madison Heights, MI (US); Thomas A. Seder, Fraser, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/599,777

(22) Filed: Oct. 11, 2019

(51) Int. Cl.
| | |
|---|---|
| *G02B 27/01* | (2006.01) |
| *H04N 9/31* | (2006.01) |
| *B60K 35/00* | (2006.01) |
| *G06T 19/00* | (2011.01) |

(52) U.S. Cl.
CPC ......... *G02B 27/0179* (2013.01); *B60K 35/00* (2013.01); *H04N 9/3179* (2013.01); *B60K 2370/1529* (2019.05); *B60K 2370/31* (2019.05); *B60K 2370/92* (2019.05); *B60K 2370/95* (2019.05); *G06T 19/006* (2013.01)

(58) Field of Classification Search
None
See application file for complete search history.

(56) References Cited

U.S. PATENT DOCUMENTS

| | | | |
|---|---|---|---|
| 2008/0192312 A1* | 8/2008 | Hendricks | G03H 1/0808 359/13 |
| 2015/0317838 A1* | 11/2015 | Foxlin | G02B 27/0093 345/633 |
| 2015/0331487 A1* | 11/2015 | Roth | G06F 3/013 345/156 |
| 2016/0349510 A1* | 12/2016 | Miller | H04N 13/398 |
| 2017/0195647 A1* | 7/2017 | Honkanen | H04N 9/315 |
| 2017/0343805 A1* | 11/2017 | Amaru | G02B 27/0101 |
| 2018/0143682 A1* | 5/2018 | Larson | G02B 27/0172 |
| 2020/0082570 A1* | 3/2020 | Wunderwald | G02B 27/0101 |
| 2020/0108719 A1* | 4/2020 | Sumiyoshi | G02B 27/0101 |

* cited by examiner

*Primary Examiner* — Steven Z Elbinger
(74) *Attorney, Agent, or Firm* — Cantor Colburn LLP

(57) ABSTRACT

Calibrating a virtual image projected from a vehicle HUD system onto a windshield includes displaying a fiducial at a predetermined location upon the windshield, projecting a test image from a test image generator within the HUD system, aligning the test image with the fiducial, determining a positional deviation from a test image calibrated position required to align the test image with the fiducial, and based upon the positional deviation and a known positional relationship between a virtual image calibrated position and the test image calibrated position, aligning the virtual image with the fiducial.

17 Claims, 2 Drawing Sheets

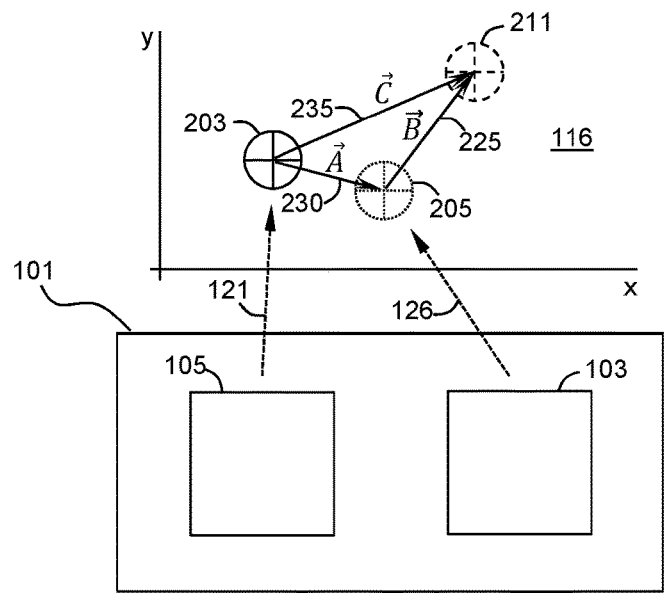
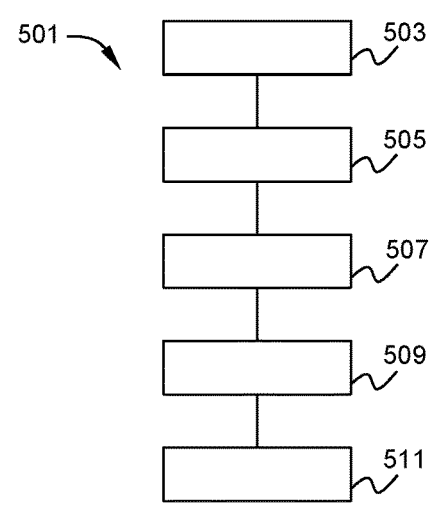
FIG. 2
FIG. 5
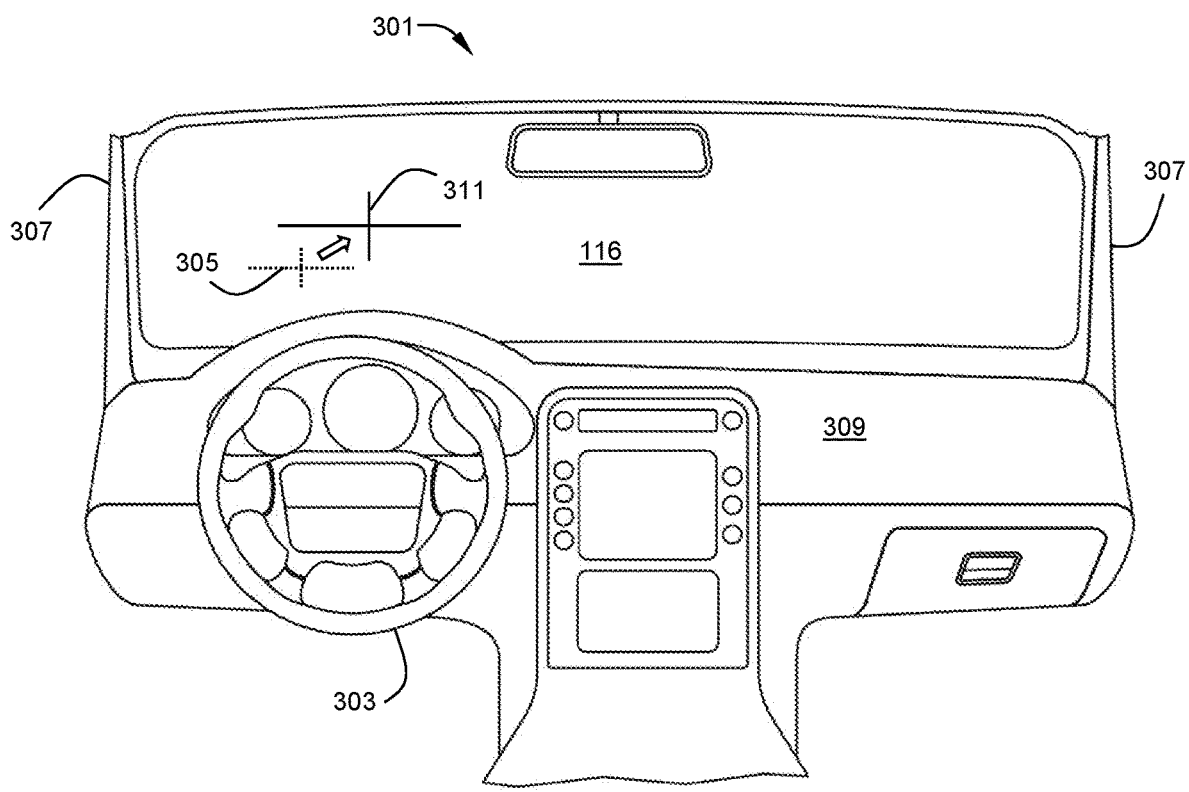
FIG. 3

HEAD-UP DISPLAY CALIBRATION

INTRODUCTION

This disclosure is related to head-up displays (HUD).

A HUD is a display that presents data in a partially transparent manner and at a position allowing a user to see it without having to look away from his/her usual viewpoint (e.g., substantially forward). Although developed for military use, HUDs are now used in commercial aircraft, automobiles, computer gaming, and other applications.

Within vehicles, HUDs may be used to project virtual images or vehicle parameter data in front of the vehicle windshield or surface so that the image is in or immediately adjacent to the operator's line of sight. Vehicle HUD systems can project data based on information received from operating components (e.g., sensors) internal to the vehicle to, for example, notify users of lane markings, identify proximity of another vehicle, or provide nearby landmark information.

HUDs may also receive and project information from information systems external to the vehicle, such as a navigational system on a smartphone. Navigational information presented by the HUD may include, for example, projecting distance to a next turn and current speed of the vehicle as compared to a speed limit, including an alert if the speed limit is exceeded. External system information advising what lane to be in for an upcoming maneuver or warning the user of potential traffic delays can also be presented on the HUD.

HUDs may also be employed in augmented reality displays or enhanced vision systems that identify, index, overlay or otherwise reference objects and road features including infrastructure. Such advanced systems require precision alignment of HUD images relative to the observers within the vehicle and objects within their field of view.

SUMMARY

In one exemplary embodiment, a method for calibrating a virtual image projected from a vehicle HUD system onto a windshield includes displaying a fiducial at a predetermined location upon the windshield, projecting a test image from a test image generator within the HUD system, aligning the test image with the fiducial, determining a positional deviation from a test image calibrated position required to align the test image with the fiducial, and based upon the positional deviation and a known positional relationship between a virtual image calibrated position and the test image calibrated position, aligning the virtual image with the fiducial.

In addition to one or more of the features described herein, displaying the fiducial includes projecting the fiducial from an image projector affixed to a predetermined vehicle component.

In addition to one or more of the features described herein, displaying the fiducial includes affixing the fiducial to the windshield.

In addition to one or more of the features described herein, aligning the test image with the fiducial includes manually adjusting the test image.

In addition to one or more of the features described herein, aligning the test image with the fiducial includes autonomously adjusting the test image.

In another exemplary embodiment, a method for calibrating a virtual image projected from a vehicle HUD system onto a windshield includes displaying a fiducial at a predetermined location upon the windshield, projecting a test image from a test image generator within the HUD system, aligning the test image with the fiducial by moving the test image from a predetermined test image calibrated position to a test image alignment position, determining a test image alignment offset based upon the predetermined test image calibrated position and the test image alignment position, determining a test image offset based upon the predetermined test image calibrated position and a predetermined virtual image calibrated position, determining a desired virtual image offset based upon the test image alignment offset and the test image offset, and aligning the virtual image with the fiducial by moving the virtual image from the predetermined virtual image calibrated position to the test image alignment position.

In addition to one or more of the features described herein, displaying the fiducial includes projecting the fiducial from an image projector affixed to a predetermined vehicle component.

In addition to one or more of the features described herein, displaying the fiducial includes affixing the fiducial to the windshield.

In addition to one or more of the features described herein, aligning the test image with the fiducial includes manually adjusting the test image.

In addition to one or more of the features described herein, aligning the test image with the fiducial includes autonomously adjusting the test image In yet another exemplary embodiment, an apparatus for calibrating a virtual image projected from a vehicle HUD system onto a windshield includes a HUD having a virtual image generator for projecting a virtual image and a test image generator for projecting a test image, and a fiducial displayed upon the windshield at a predetermined location. The apparatus further includes a control module configured to project the test image upon the windshield from the test image generator at a calibrated test image position, align the test image with the fiducial based upon alignment inputs received by the control module, and determine a positional deviation of the test image from the calibrated test image position required to align the test image with the fiducial. The control module is further configured to determine a positional deviation of the virtual image from the calibrated virtual image position required to align the virtual image with the fiducial based upon the positional deviation of the test image and a known positional relationship between a calibrated virtual image position and the calibrated test image position, and set the calibrated virtual image position to align with the fiducial based upon the positional deviation of the virtual image from the calibrated virtual image position required to align the virtual image with the fiducial.

In addition to one or more of the features described herein the apparatus further includes at least one user interface for receiving inputs from an operator, wherein the control module is further configured to receive the inputs from the at least one user interface, and wherein the alignment inputs received by the control module include manual inputs from the operator guiding the movement of the test image into alignment with the fiducial.

In addition to one or more of the features described herein the apparatus further includes at least one user interface for receiving inputs from an operator and an image sensor, wherein the control module is further configured to receive the inputs from the at least one user interface, and wherein the alignment inputs received by the control module include a command to the control module to iteratively move the test image into alignment with the fiducial as determined with the image sensor.

In addition to one or more of the features described herein, the apparatus further includes an image projector projecting the fiducial upon the windshield.

In addition to one or more of the features described herein, the apparatus further includes an image projector projecting the fiducial upon the windshield.

In addition to one or more of the features described herein, the apparatus further includes a fixture attached to a vehicle component wherein the image projector is attached to the fixture.

In addition to one or more of the features described herein, the image projector includes an in-plant production tooling including a vision system.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which:

FIG. 2 illustrates various positional relationships among various feature positions in accordance with the present disclosure;

FIG. 3 illustrates a forward-looking view of a portion of the interior of a passenger vehicle substantially along a longitudinal centerline in accordance with the present disclosure;

FIG. 5 illustrates an exemplary method for calibrating the position of a virtual image in accordance with the present disclosure.

DETAILED DESCRIPTION

Figure 1:
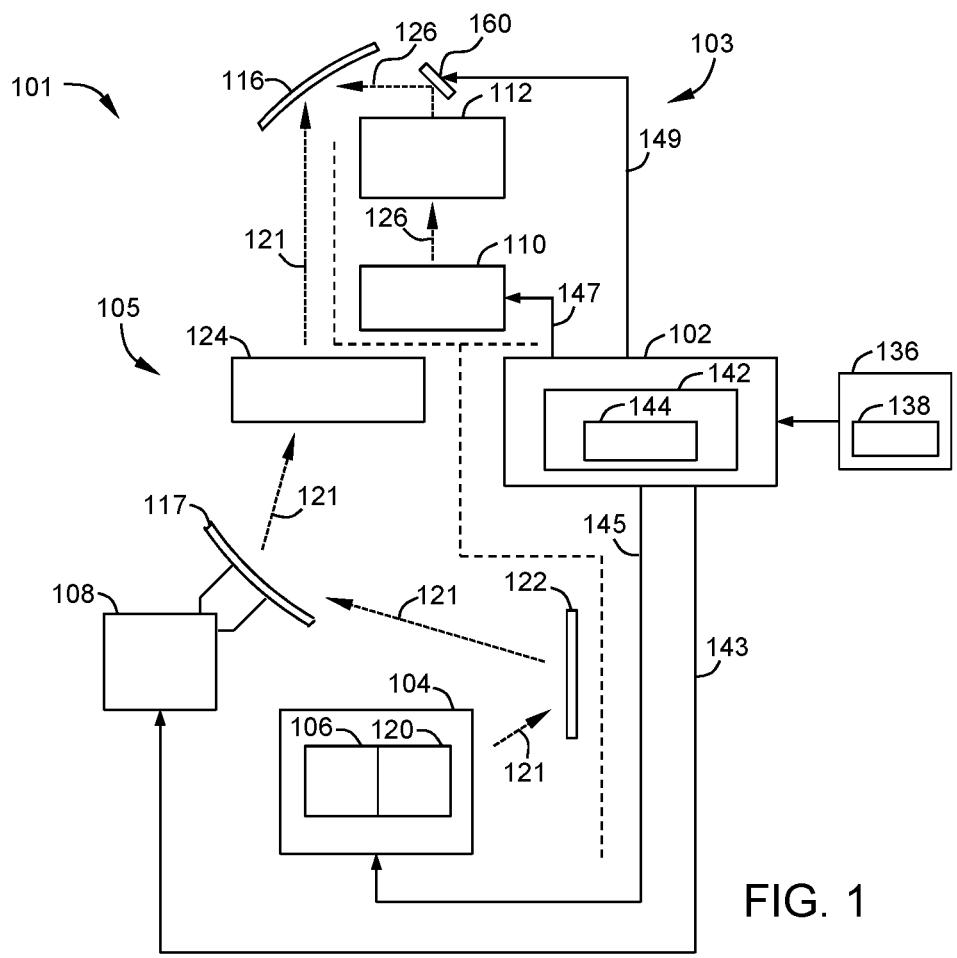
FIG. 1 illustrates a HUD system in accordance with the present disclosure.

The following description is merely exemplary in nature and is not intended to limit the present disclosure, its application or uses. Throughout the drawings, corresponding reference numerals indicate like or corresponding parts and features. As used herein, control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only memory (ROM), random access memory (RAM), electrically programmable read only memory (EPROM), hard drive, etc.) or microcontrollers executing one or more software or firmware programs or routines, combinational logic circuit(s), input/output circuitry and devices (I/O) and appropriate signal conditioning and buffer circuitry, high speed clock, analog to digital (A/D) and digital to analog (D/A) circuitry and other components to provide the described functionality. A control module may include a variety of communication interfaces including point-to-point or discrete lines and wired or wireless interfaces to networks including wide and local area networks, on vehicle controller area networks and in-plant and service related networks. Functions of a control module as set forth in this disclosure may be performed in a distributed control architecture among several networked control modules. Software, firmware, programs, instructions, routines, code, algorithms and similar terms mean any controller executable instruction sets including calibrations, data structures, and look-up tables. A control module has a set of control routines executed to provide described functions. Routines are executed, such as by a central processing unit, and are operable to monitor inputs from sensing devices and other networked control modules and execute control and diagnostic routines to control operation of actuators. Routines may be executed at regular intervals during ongoing engine and vehicle operation. Alternatively, routines may be executed in response to occurrence of an event.

FIG. 1 shows a head-up display (HUD) 101 in accordance with the present disclosure. The HUD 101 includes a control module 102, a virtual image generator 105 including a virtual image generating module 104 including a first light source 106 and a mirror actuator 108, and a test image generator 103 including a second light source 110 and a test image optic assembly 112. The control module 102 controls the operation of the virtual image generating module 104 and first light source 106 via control line 145 to generate a virtual image. The control module 102 also controls the operation of the second light source 110 via control line 147 to generate a test image on windshield 116. The control module 102 controls the operation of the mirror actuator 108 via control line 143 to rotate or tilt a mirror 117 and adjust where on windshield the HUD virtual image is projected. The mirror actuator may include a motor, gears, shafts, and/or other components to change the position and/or orientation of the mirror 117. The mirror 117 may magnify the image generated by the virtual image generating module 104 and/or correct for distortions associated with the windshield 116.

In one embodiment, the HUD 101 includes the virtual image generating module 104, the mirror actuator 108, the mirror 117 and the one or more mirrors 122. In another embodiment, the HUD 101 also includes the second light source 110 and the test image optic assembly 112. In one embodiment, the virtual image generating module 104, the mirror actuator 108, the mirror 117, and the one or more mirrors 122 are implemented in a separate housing than the second light source 110 and the test image optic assembly 112. In another, preferred, embodiment, the virtual image generating module 104, the mirror actuator 108, the mirror 117, the one or more mirrors 122, the second light source 110 and the test image optic assembly 112 are implemented in a single housing.

The virtual image generating module 104 may include the first light source 106 and a display and lens assembly 120. The first light source 106 generates a virtual image light beam 121 including graphic images that are projected onto a display of the display and lens assembly 120. The virtual image light beam 121 is then directed at a series of one or more mirrors 122. The one or more mirrors 122 may include, for example, a fold mirror. The one or more mirrors 122 may be used for packaging reasons. The virtual image light beam 121 is reflected at the mirror 117 and then reflected through light and glare traps 124 to the windshield 116. The virtual image light beam 121 is displayed on the windshield. The light and glare traps 124 may filter and thus prevent, for example, sun light (or ambient light) from being reflected from the windshield 116 towards the mirror 117 and minimize effects of glare.

The second light source 110 may include a laser, one or more light emitting diodes (LEDs), or other test image generating light source. The second light source 110 generates a test image light beam 126, which is directed through the test image optic assembly 112, off adjustable mirror 160, and reflected off of the windshield 116. The control module 102 controls operation of the adjustable mirror 160 via control line 149. Adjustable mirror 160 may include an x,y galvanic mirror allowing for positional adjustments of the test image.

The HUD 101 may further include and/or be connected to a manual controller 136 including switches (buttons, paddles, sliders, rotaries, joysticks or the like) 138. The HUD 101 may also include and/or be connected to a display, seat motors, or seat switches (not separately illustrated). The display may be, for example, a touchscreen, an infotainment display located in a center console of a vehicle, or other display. The seat motors are used to position one or more seats. The control module 102 may control operations of the seat motors based on user inputs via the seat switches and/or seat settings stored in memory. The manual controller 136 may be used by a user to manually adjust height of virtual images provided by the virtual image generating module 104 via the switches 138. Alternatively, a display touchscreen may provide a user interface (UI) for manual adjustments of the HUD virtual image during end user application such as by a vehicle occupant. Such a display, seat switches and switches 138 may be referred to as input devices and/or interfaces or more generally as a user interface. In limited circumstances in accordance with the present disclosure, the input devices may provide a user interface for manual adjustments of the test image or to establish operator intent or control of an automated or partially automated alignment procedure.

The virtual image light beam 121 may follow a main ray path of a HUD virtual image from a center of a HUD display, which is part of the display and lens assembly 120 to the windshield 116. The main ray path is referred to as a gut ray. The test image light beam 126 for the test image may follow a different path than the virtual image light beam 121. The path of the test image light beam 126 may or may not be parallel to a portion of or the entire path of the virtual image light beam 121. The light beams 121, 126 do not need to follow the same optical path.

Certain HUD applications require precise alignment of the virtual images produced by the HUD. Placement of simple information presentation on the windshield, such as conventional engine gauge display, is not positionally critical. However, augmented reality systems intended to improve driver or occupant situational awareness by identifying, overlaying, or otherwise enhancing visibility of objects or features located on a road scene require virtual image placement taking into consideration the observer's eye position, the scene object position and the vehicle windshield position. In order to enable robust virtual image placement fidelity in such systems, the virtual image position must be calibrated relative to the vehicle reference frame.

Figure 4:
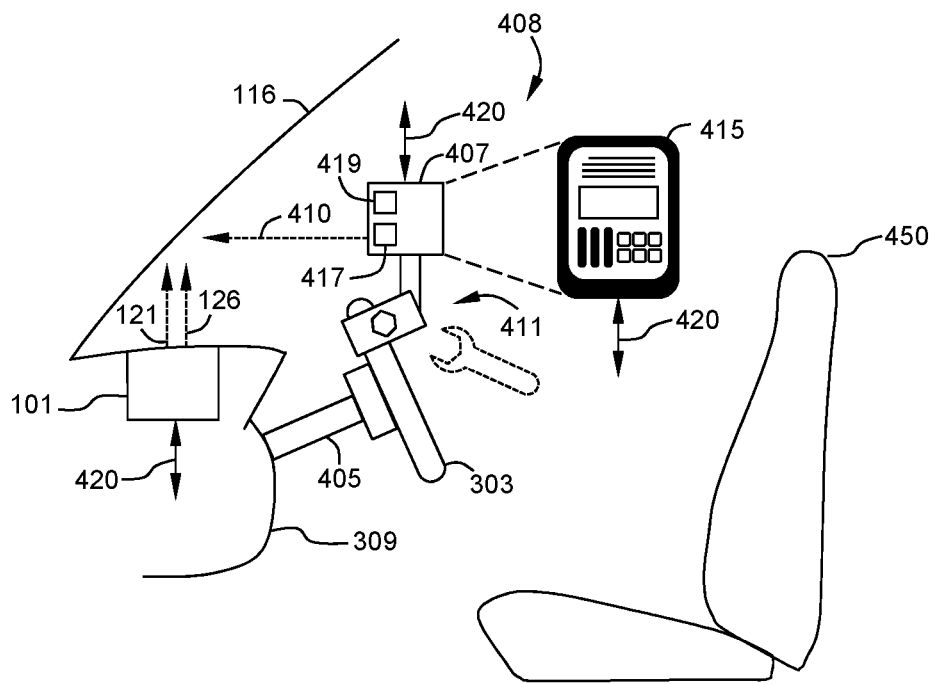
FIG. 4 illustrates an exemplary apparatus for calibrating the position of a virtual image to a vehicle reference frame in accordance with the present disclosure.

In accordance with one embodiment, a temporary fiducial is displayed upon the windshield of the vehicle at a predetermined position. The fiducial may be physically affixed to the windshield or may be virtually displayed thereon such as by light projection. As used herein with respect to fiducial placement or location, the term displayed includes physically affixed to or virtually displayed on such as by light projection. FIG. 3 illustrates a forward-looking view of a portion of the interior of a passenger vehicle 301 substantially along a longitudinal centerline. Dashboard assembly 309 extends laterally within the vehicle cabin substantially forward of the doors and beneath and between the A-pillars 307. A-pillars 307 frame the windshield 116. Steering wheel 303 is located forward of the driver seating 450 (FIG. 4) and is coupled to a steering column assembly 405 (FIG. 4). Fiducial 311 is illustrated affixed or projected upon windshield 116 substantially centered with respect to the steering wheel 303 though not limited to such placement. Fiducial 311 may be a simple geometric graphic such as a grid, concentric circles or, as illustrated, a simple cross-hair pattern formed by a pair of normally intersecting lines. In the case of a physically affixed fiducial, such may be affixed by any practical means and take such exemplary forms as mild adhesive backed or static cling material which may be readily removed. In order to index placement of such affixed fiducials and ensure accurate placement at the predetermined position, any of a variety of simple fixturing or gauging may be employed. For example, the A-pillars may provide fixture mounting locations for precise placement of an affixed fiducial relative to the A-pillars. Alternatively, a simple template aligned to features on the windshield may be employed for fiducial adhesion to the windshield. In accordance with another embodiment for fiducial display, a light projector may be employed to project a virtual fiducial upon the windshield. The location of such a virtual fiducial at the predetermined location may be ensured by fixturing a projector, for example a so-called pico-projector, to the vehicle reference frame. One or both of the A-pillars may be employed for fixturing as can the steering wheel 303 as will be later described. Alternatively, the projector or other light source for producing and projecting the fiducial may be part of the in-plant production tooling including, for example, a vision system for locating the projected fiducial on the windshield relative to the vehicle reference frame. Regarding fiducial image projection, projector, image projector, or fiducial projector are understood to mean any suitable light image projector (LED, LASER, lamp based, etc.).

Assembly of HUD 101 into the vehicle may be accomplished by the installation of an entire dash assembly into which the HUD 101 has been assembled as part of a subassembly process or build-up of the dash assembly 309. Alternatively, a smaller subassembly including an instrument cluster pod may contain the HUD 101 and may be assembled to the dash assembly already installed within the vehicle. Alternatively, the HUD 101 may be assembled into the instrument cluster, dash assembly or upper dash pad as a separate assembly component. In accordance with one embodiment, a test image 305 is projected upon the windshield 116 subsequent to the HUD 101 installation within the vehicle. Test image 305 is produced by test image generator 103 of HUD 101 and may be the same simple geometric graphic as fiducial 311 or a complementary graphic such as an outline of the fiducial graphic. In the illustrated embodiment, test image 305 is also a simple cross-hair pattern formed by a pair of normally intersecting lines. The virtual image may have a calibrated alignment position specification corresponding to the predetermined fiducial position 211 (FIG. 2). However, numerous tolerance stack ups may result in the projected virtual image being displaced from the predetermined fiducial position. Similarly, the test image 305 may have a projected position displaced from the predetermined fiducial position 211 as illustrated by the separation of the test image 305 from the fiducial 311 displayed upon the windshield 116.

With reference to FIG. 2, HUD 101 is illustrated including virtual image generator 105 and test image generator 103. Virtual image generator 105 projects virtual image light beam 121 toward windshield 116. Test image generator 103 also projects test image light beam 126 toward windshield 116. While the surface of windshield 116 is not likely to be planar, the HUD 101 projections from virtual image generator 105 and test image generator 103 are positionally controllable within limits in a substantially planar, two-dimensional space illustrated in FIG. 2 by horizontal x-axis and vertical y-axis. The virtual image generator 105 projects the virtual image to a calibrated virtual image position 203 which is initially set during HUD manufacture and stored in a non-volatile memory location within HUD controller 102. The test image generator 103 projects the test image 305 (FIG. 3) to a calibrated test image position 205 which also is initially set during HUD manufacture and stored in a non-volatile memory location within HUD controller 102. The x,y positional difference between the calibrated virtual image position 203 and the calibrated test image position 205 is known from these design parameters and may be referred to as a test image offset 230 shown as vector $\vec{A}$ with tail at calibrated virtual image position 203. Desirably, the virtual image from the virtual image generator 105 is to be positioned at the fiducial position 211. For example, the virtual image center is desirably aligned with the center of the fiducial thereby aligning the virtual image with the vehicle reference frame. Test image 305 (FIG. 3) is projected upon the windshield 116 at calibrated test image position 205. The difference between the calibrated test image position 205 and the fiducial position 211 may be referred to as test image alignment offset 225 shown as vector $\vec{B}$ with tail at calibrated test image position 205. Test image 305 position may be adjusted such that the test image 305 overlays and aligns with the fiducial 311. From the calibrated test image position 205 and the x,y positional deviation required to align test image 305 with fiducial 311, test image alignment offset 225 shown as vector $\vec{B}$ may be determined. The virtual image is projected upon the windshield 116 at calibrated virtual image position 203. The difference between the calibrated virtual image position 203 and the fiducial position 211 may be referred to as desired virtual image offset 235 shown as vector $\vec{C}$ with tail at calibrated virtual image position 205. The difference between the calibrated virtual image position 203 and the fiducial position 211 may be determined therefore from the x,y positional deviation required to align test image 305 with fiducial 311 and the x,y positional difference between the calibrated virtual image position 203 and the calibrated test image position 205.

In accordance with one embodiment and with reference to FIG. 5, a method for calibrating the position of the virtual image 501 includes displaying a fiducial at a predetermined location upon the windshield 503. Display of the fiducial may be in accordance with affixing a fiducial to the windshield or projecting a fiducial image upon the windshield. A test image is projected from a test image generator within the HUD system 505 onto the windshield at a test image calibrated position known in accordance with the HUD calibration. Test image projection may be initiated by an operator through any of a variety of user interfaces as previously set forth in the disclosure. The test image is aligned with the fiducial 507. Alignment may be manually such as through any of a variety of user interfaces as previously set forth in the disclosure or as established in accordance with operator intent or control of an automated or partially automated alignment procedure which may be invoked through any of a variety of user interfaces as previously set forth in the disclosure. The positional deviation required to align the test image with the fiducial is determined from the calibrated position of the test image and the position of the test image when aligned with the fiducial 509. The virtual image has a known virtual image calibrated position in accordance with the HUD calibration. Since the virtual image calibrated position is known, the test image calibrated position is known, and the positional deviation required to align the test image with the fiducial is also known, the deviation in the location of the virtual image required to align the virtual image with the fiducial is readily determined. This deviation may be used to align the virtual image to the fiducial position 511. Alignment of the virtual image may be implemented in various ways depending upon the particular hardware configuration of the HUD and more particularly of the virtual image generator 105. By way of non-limiting examples, alignment of the virtual image may be effected by rotation of an interior mirror in the case of a DLP HUD system, application of a lens function to the phase hologram in the case of a holographic HUD system, or image translation on an LCD display having reserve pixels or x,y translation of the entire LCD display in a LCD HUD system.

In accordance with one embodiment and with reference to FIG. 4, an apparatus for calibrating the position of the virtual image to a vehicle reference frame in accordance with the present disclosure is illustrated. The embodiment illustrated is well suited to the controlled production environment of a final assembly plant though such apparatus may be employed in a field service environment. A vehicle interior includes a dash assembly 309 wherein HUD 101 is contained. Steering column assembly 405 is attached to structural brackets beneath the dash assembly 309. Steering wheel 303 is attached to an end of steering column assembly 405. Steering column assembly 405 may include a tilt/telescoping mechanism which allows for selectively adjusting the steering column/wheel between extreme raised and lowered positions and between extreme fore/aft positions. HUD 101 is configured to project a test image via test image light beam 126 toward windshield 116 and a virtual image via virtual image light beam 126 also toward windshield 116. A calibration set-up 408 includes a calibration fixture 411 and optical calibration assembly 407 secured thereto. Optical calibration assembly may include one or both of a fiducial projector 417 and an image sensor 419. A fiducial projector 417, for example a pico-projector, is useful in an arrangement wherein a projected fiducial is desired. An image sensor, for example a CCD or CMOS camera, is useful in an arrangement wherein the alignment of the test image to the fiducial is automated. The calibration set-up 408 may also include a display or other user/control interface 415 which may be a part of or separate from the optical calibration assembly, for example an integrated display or a separate smart device for example a tablet, laptop computer or the like. The calibration set-up may also include one or more control modules adapted to provide a calibration application including UI and instructional prompts, and communication and networking functions. Such a control module is preferably associated with one or more of the calibration assembly or separate smart device. Communications among the HUD 101, optical calibration assembly 407, user/control interface 415, and various in-plant production control and information systems may be carried out by any appropriate wired or wireless means including for example the vehicle controller area network. In practice, the steering column assembly 405 is placed into extreme tilt and telescoping positions to reduce the variability of the steering wheel position relative to the vehicle reference frame. Subsequently, the calibration fixture 411 and optical calibration assembly 407 is secured to the steering wheel such that the fiducial projector 417 will display the fiducial image upon the windshield at the desired position. Alternatively, as previously mentioned, calibration fixture 411 and optical calibration assembly 407 secured thereto may be secured to other structures within the vehicle providing a repeatable positional relationship to the vehicle reference frame, for example one or more of A-pillars, B-pillars, door opening frame, etc.

Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A method for calibrating a virtual image projected from a vehicle head-up display (HUD) system onto a windshield, comprising:
   displaying a fiducial at a predetermined fiducial position upon the windshield;
   projecting a test image from a test image generator to a calibrated test image position stored within the HUD system;
   aligning the projected test image with the fiducial;
   determining a test image alignment offset comprising positional deviation of the projected test image from the calibrated test image position required to align the projected test image with the fiducial;
   projecting a virtual image from a virtual image generator independent from the test image generator; and
   aligning the projected virtual image with the fiducial based upon the test image alignment offset and a known positional relationship between a calibrated virtual image position stored within the HUD system and the calibrated test image position stored within the HUD system.

2. The method of claim 1, wherein displaying the fiducial comprises projecting the fiducial from an image projector that is separate from the HUD system and affixed to a predetermined vehicle component.

3. The method of claim 1, wherein displaying the fiducial comprises affixing the fiducial to the windshield.

4. The method of claim 1, wherein aligning the test image with the fiducial comprises manually adjusting the test image.

5. The method of claim 1, wherein aligning the test image with the fiducial comprises autonomously adjusting the test image.

6. A method for calibrating a virtual image projected from a vehicle head-up display (HUD) system onto a windshield, comprising:
   displaying a fiducial at a predetermined fiducial position upon the windshield;
   projecting a test image from a test image generator to a calibrated test image position stored within the HUD system;
   aligning the projected test image with the fiducial by moving the projected test image from the calibrated test image position to a test image alignment position;
   determining a test image alignment offset as the difference between the calibrated test image position and the test image alignment position;
   determining a test image offset as the difference between the calibrated test image position and a calibrated virtual image position stored within the HUD system;
   determining a desired virtual image offset from the calibrated virtual image position based upon the test image alignment offset and the test image offset; and
   projecting a virtual image from a virtual image generator independent from the test image generator based upon the calibrated virtual image position and the desired virtual image offset.

7. The method of claim 6, wherein displaying the fiducial comprises projecting the fiducial from an image projector that is separate from the HUD system and affixed to a predetermined vehicle component.

8. The method of claim 6, wherein displaying the fiducial comprises affixing the fiducial to the windshield.

9. The method of claim 6, wherein aligning the test image with the fiducial comprises manually adjusting the test image.

10. The method of claim 6, wherein aligning the test image with the fiducial comprises autonomously adjusting the test image.

11. An apparatus for calibrating a virtual image projected from a vehicle head-up display (HUD) system onto a windshield, comprising:
    a HUD including a virtual image generator for projecting a virtual image and a test image generator independent from the virtual image generator for projecting a test image;
    a fiducial displayed upon the windshield at a predetermined fiducial position;
    a control module configured to:
    project the test image upon the windshield from the test image generator at a calibrated test image position stored within a first non-volatile memory location of the control module;
    align the projected test image with the fiducial based upon alignment inputs received by the control module;
    determine a test image alignment offset comprising positional deviation of the projected test image from the calibrated test image position required to align the projected test image with the fiducial;
    based upon the test image alignment offset and a known positional relationship between a calibrated virtual image position stored within a second non-volatile memory location of the control module and the calibrated test image position stored within the first non-volatile memory location of the control module, determine a positional deviation of the virtual image from the calibrated virtual image position required to align the virtual image with the fiducial; and set the calibrated virtual image position to align with the fiducial based upon the positional deviation of the virtual image from the calibrated virtual image position required to align the virtual image with the fiducial.

12. The apparatus of claim 11, further comprising:

at least one user interface for receiving inputs from an operator, wherein said control module is further configured to receive said inputs from said at least one user interface, and wherein said alignment inputs received by the control module comprise manual inputs from said operator guiding the movement of the test image into alignment with the fiducial.

13. The apparatus of claim 11, further comprising:

at least one user interface for receiving inputs from an operator and an image sensor, wherein said control module is further configured to receive said inputs from said at least one user interface, and wherein said alignment inputs received by the control module comprise a command to the control module to iteratively move the test image into alignment with the fiducial as determined with said image sensor.

14. The apparatus of claim 13, further comprising:

an image projector that is separate from the HUD system projecting said fiducial upon the windshield.

15. The apparatus of claim 11, further comprising:

an image projector that is separate from the HUD system projecting said fiducial upon the windshield.

16. The apparatus of claim 15, further comprising:

a fixture attached to a vehicle component wherein the image projector is attached to the fixture.

17. The apparatus of claim 15, wherein the image projector comprises an in-plant production tooling including a vision system.

* * * * *